United States Patent Office 2,746,360
Patented May 22, 1956

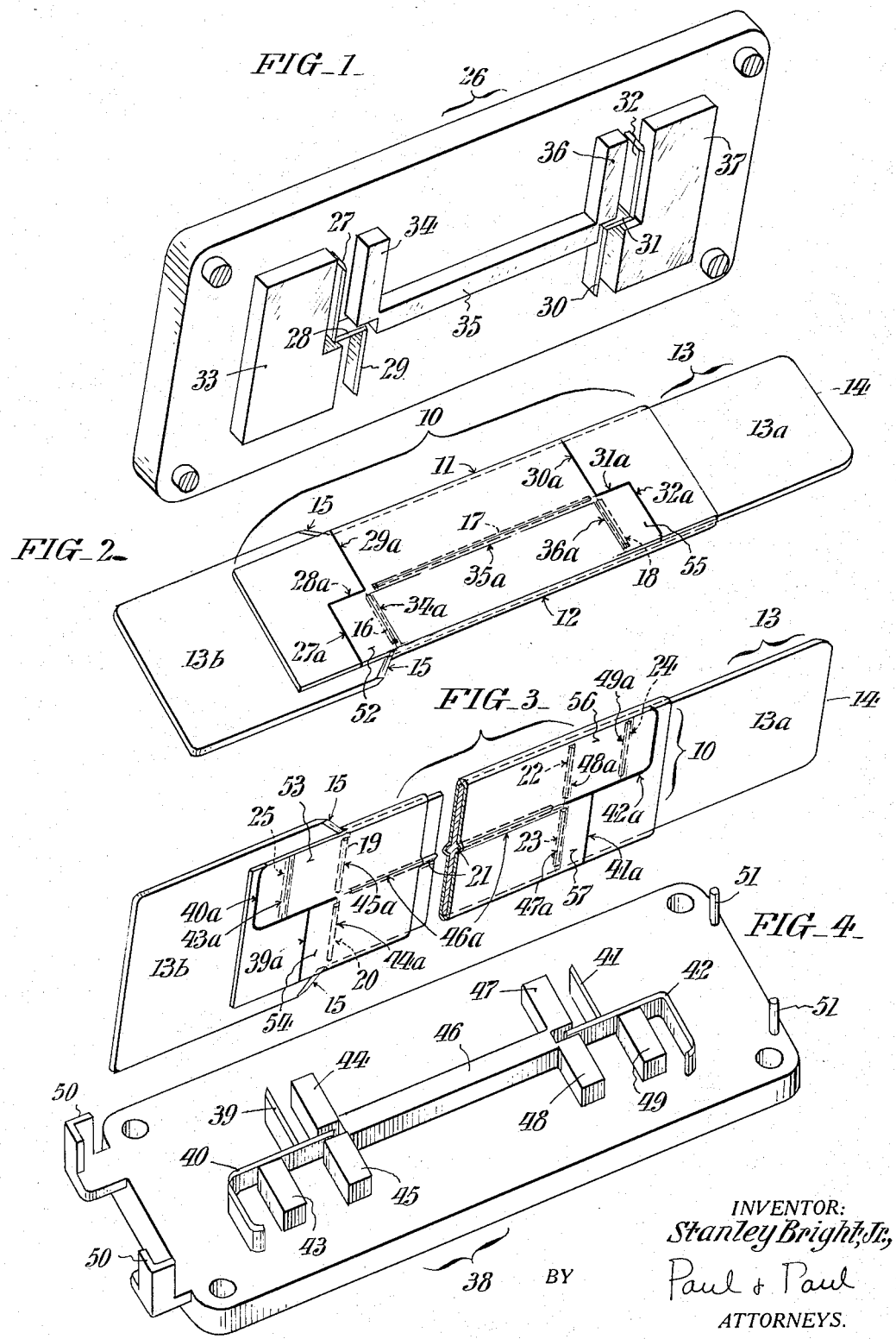

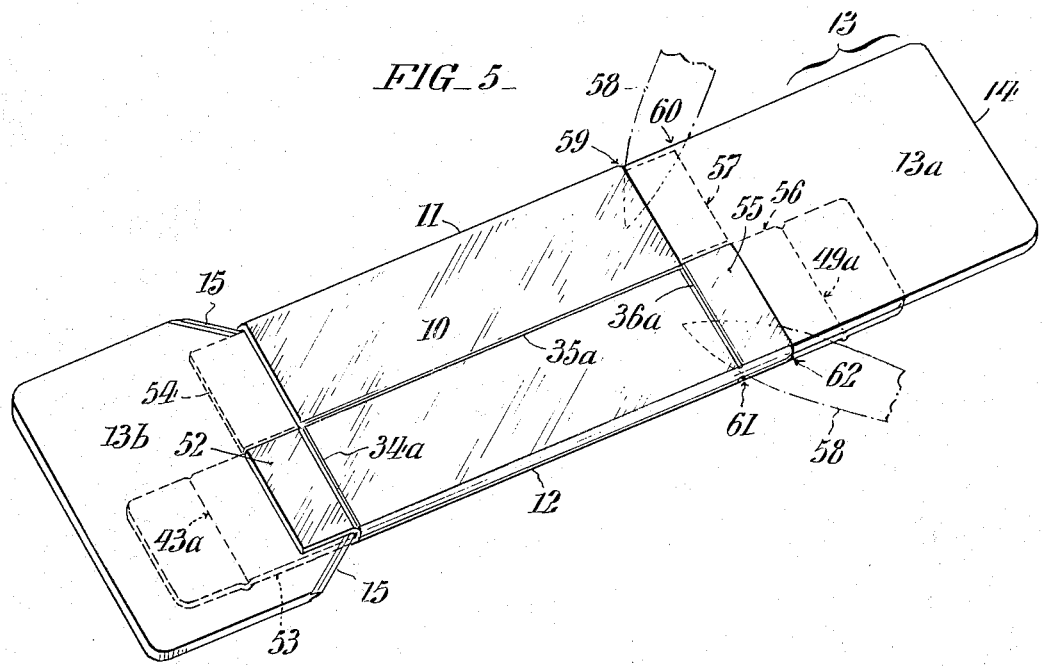
FIG_5_
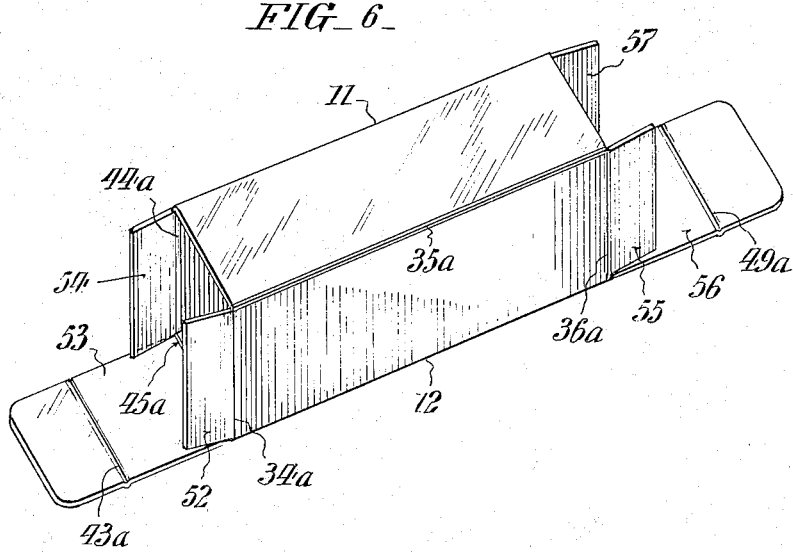
FIG_6_

2,746,360

APPARATUS AND METHOD FOR MAKING FOLDING PLASTIC CONTAINERS

Stanley Bright, Jr., Haverford, Pa., assignor to Troth Bright Page, Inc., Paoli, Pa., a corporation of Pennsylvania Application May 9, 1952, Serial No. 287,064

10 Claims. (Cl. 93—36)

This invention relates to apparatus and method for making folding plastic containers, and further relates to apparatus and method for making a seamless plastic folding container blank. More particularly, the invention relates to a method which comprises extruding a plastic tube of enclosed cross section, folding the tube substantially flat, inserting a mandrel having scoring ridges mounted thereon between the folds and cutting and scoring the transparent material at each side of the mandrel to provide flaps or tabs and a fold line between each of the original folds.

Plastic folding containers, which are relatively new in the art, are usually assembled in final form by heat sealing or by means of adhesives applied along a flap element. The fabrication of containers by this method involves not only an extra operation but also results in a visible line along the joining element.

It is accordingly an object of this invention to provide a rapid and economical method of making a plastic folding container having no adhesive seams. It is another object of my invention to make a strong, durable plastic folding container blank in the form of a flat double sheet for convenience and economy in shipping. Other objects and means for carrying them into effect will appear hereinafter and in the drawings, in which:

Fig. 1 is a bottom view in perspective of the upper or male cutting and scoring die used in my process.

Fig. 2 is a top view in perspective of the mandrel used in my process with a plastic blank inserted thereon.

Fig. 3 is a bottom view in perspective of the mandrel and blank with a portion broken away and showing in section constructional details thereof.

Fig. 4 is a top view in perspective of the lower or female cutting and scoring die used in my process.

Fig. 5 is a top view in perspective of the mandrel and blank showing the final cutting operation of my process.

Fig. 6 is a perspective view of a plastic folding container blank produced by my process.

In practicing the method which constitutes my invention, a suitable transparent plastic material is first extruded through a set of dies or other extruding means to form a hollow plastic tube. For purposes of the first step, the plastic may consist of a transparent organic thermoplastic or thermo setting material such as cellulose acetate, polyethylene resins, methyl methacrylate resins, vinyl acetate-vinyl chloride copolymers, vinylidene chloride copolymers, or other plastics which become partially fluid under pressure and which revert to an inflexible physical state when the pressure is released. It will be understood that a particular plastic material may be preferred in certain cases in view of the desired characteristics of the finished container for particular purposes.

The extrusion of several varieties of plastics may be accomplished at ordinary temperatures by application of pressure against the bulk plastic material to force it through a die. In some cases, however, it is found desirable to enhance the plasticity of the plastic and for this purpose one of the various known plasticizers may be compounded into the particular plastic to be extruded. It is also possible to include minor amounts of solvent in the plastic to facilitate extrusion. In practicing the extrusion step of my invention, the plastic material may be forced through the annular space between a pair of extrusion dies or in other apparatus commonly employed for the extrusion of plastic material of this type. The dies are preferably circular in shape and produce a continuous hollow plastic tube. Plastic structures having closed cross sections of any kind are referred to herein as tubes. In carrying out the extrusion step of my method, the extrusion dies may be heated to attain preferred extrusion of some plastic materials, and to drive off any solvent that may have been included in the original plastic stock, but in many instances the extrusion may be accomplished without heating.

After extrusion, the hollow plastic tube is flattened in any manner well known in the art to form a pair of substantially flat, oppositely positioned plastic walls. From the flattened tube are cut blanks 10 (Fig. 2) of a predetermined size having longitudinal fold lines 11 and 12. Blank 10 is then fitted over a flat rigid mandrel 13, as shown in Figs. 2 and 3, by sliding said blank over end 14 of said mandrel.

Mandrel 13 is formed preferably of hardened steel and has a relatively narrow tongue element 13a which merges into a somewhat wider head element 13b. Sloping knife edges 15 join the outer edges of the head element 13b with the outer edges to tongue element 13a. Mounted in the upper face of tongue element 13a of mandrel 13, as shown in Fig. 2, are raised scoring ridges 16, 17 and 18. Mounted on the lower face of tongue element 13a of mandrel 13, as shown in Fig. 3, are raised scoring ridges 19, 20, 21, 22, 23, and 24 and mounted on the lower face of the head element 13b thereof is a raised scoring ridge 25.

The cutting and scoring operation on the upper wall of the blank is accomplished by means of die 26 having cutting blades 27, 28, 29, 30, 31 and 32 and resilient pads 33, 34, 35, 36, and 37, preferably made of hard rubber, mounted thereon. The cutting and scoring operation on the lower wall of the blank is accomplished by means of die 38 having cutting blades 39, 40, 41 and 42 and resilient pads 43, 44, 45, 46, 47, 48, and 49, likewise preferably made of hard rubber, mounted thereon.

The cutting and scoring operations proceed as follows. The flattened blank 10 is inserted on tongue 13a of mandrel 13 and advanced onto head 13b as shown in Fig. 2. As the blank 10 advances onto head 13b, knife edges 15 on the mandrel 13 sever the blank 10 along folds 11 and 12. The extent of advance of the blank 10 onto mandrel head 13b and hence the extent to which the blank 10 is severed along folds 11 and 12 is limited and predetermined by the desired size of the container blank to be produced. If desired, indicating marks may be formed on mandrel head 13b to show the proper extent of advance of blank 10 thereon. After blank 10 has been properly inserted upon mandrel 13, the mandrel is then correctly positioned below die 26 and on die 38 by means of brackets 50, adapted to receive mandrel head 13b and studs 51, adapted to hold in proper alignment mandrel tongue element 13a. Thereupon, dies 26 and 38 are brought toward each other (by means of a platen press, for example) and are forcibly and simultaneously driven against the opposite walls and faces respectively of blank 10 and mandrel 13. The force exerted by one die against the blank 10 and mandrel 13 is opposed by the force exerted by the other die, thus resulting in the simultaneous cutting and scoring of each wall of the blank 10 along predetermined cutting and scoring lines. Specifically, the force exerted against mandrel 13 by cutting blades 39 and 40 and pad 45 of die 38 is opposed and absorbed by pads 33 and 34 of die 26; the force exerted against said mandrel by cutting blades 27, 28 and 39 of die 26 is opposed and absorbed by pads 43 and 44 of die 38; the force exerted against said mandrel by cutting blades 41 and 42 and pad 48 of die 38 is opposed and absorbed by pads 36 and 37 of die 26; the force exerted against said mandrel by cutting blades 30, 31 and 32 of die 26 is opposed and absorbed by pads 47 and 49 of die 38; and the force exerted against said mandrel by pad 35 on die 26 is opposed and absorbed by pad 46 on die 38.

It will be observed that the contacting of the opposed dies 26 and 38 forcibly against blank 10 and mandrel 13 will force the various cutting blades, which preferably are made of hardened steel or other suitable cutting metal, completely through the plastic walls of the blank 10 and forcibly against the unyielding, rigid surfaces of said mandrel. Specifically, cutting blades 27, 28, 29, 30, 31 and 32 of die 26 will respectively penetrate and sever the upper wall of blank 10 along lines 27a, 28a, 29a, 30a, 31a and 32a (see Fig. 2) and, similarly, cutting blades 39, 40, 41 and 42 of die 38 will penetrate and sever respectively the lower wall of blank 10 along lines 39a, 40a, 41a and 42a (see Fig. 3).

It will be further observed that pads 34, 35 and 36 are mounted upon die 26 so as to be directly and respectively above scoring ridges 16, 17 and 18 on mandrel 13 when said mandrel is properly positioned by brackets 50 and studs 51. Accordingly, when die 26 is contacted forcibly against mandrel 13 and blank 10, pads 34, 35 and 36 are pressed against that part of the upper plastic wall of blank 10 which is directly above scoring ridges 16, 17 and 18, thus stretching the plastic wall to form fold lines 34a, 35a and 36a and rendering said plastic wall foldable along said fold lines. Likewise pads 43, 44, 45, 46, 47, 48 and 49 are mounted upon die 38 so as to be directly and respectively below scoring ridges 25, 20, 19, 21, 23, 22 and 24 on mandrel 13 when said mandrel is properly positioned by brackets 50 and studs 51. When die 38 is contacted forcibly against mandrel 13 and blank 10, pads 43, 44, 45, 46, 47, 48 and 49 are pressed against that part of the lower plastic wall of blank 10 which is directly below scoring ridges 25, 20, 19, 21, 23, 22 and 24, thus stretching said plastic wall to form fold lines 43a, 44a, 45a, 46a, 47a, 48a and 49a and rendering said plastic wall foldable along said fold lines. Since the various pads on dies 26 and 38 are formed of resilient or yieldable material, the plastic walls are not severed, broken or otherwise damaged during the scoring of the various fold lines on blank 10. The yielding property of said pads permits bending of the plastic walls of the blank along the fold lines thereof rather than resulting in a parting of the plastic along said lines.

Upon completion of the cutting and scoring operations just described, flaps 52, 53 and 54 of blank 10 will be completely formed, but flaps 55, 56 and 57 will not be fully formed since those portions of fold lines 11 and 12 which define the side edges of said flaps have not been severed. The completion of the formation of blank 10 may be accomplished while said blank is still inserted upon mandrel 13, as shown in Fig. 5. A knife edge 58 (shown in dashed lines) is inserted under one of the walls of blank 10 and moved along the surface of mandrel 13 so as to sever fold line 11 between points 59 and 60 of said line and so as to sever fold line 12 between points 61 and 62 of said line. Thereupon the cuttings are separated from the blank and the finished blank 10 removed from mandrel 13 and assembled as shown in Fig. 6.

It is often relatively difficult with some extruded plastic materials, particularly where the plastic walls are relatively thick, to fold the material inward when it has been scored on the outside. The provision of a mandrel of the type herein shown and described, having scoring ridges mounted thereon, overcomes this difficulty since the fold lines formed by said scoring ridges are formed on the inside of the walls of the plastic blank, thus greatly facilitating the final assembly of the plastic blank.

It will be apparent that my new apparatus and method may be practiced in connection with any suitable plastic material that may be selected by a person skilled in the field of plastics. The invention may similarly be adopted to the manufacture of containers of widely varying shape and designs. It is to be distinctly understood that the apparatus and method herewith shown and described is to be taken as a preferred example of the same, and that various changes in the shape, size and arrangement and utilization of the parts may be resorted to without departing from the spirit of the invention or scope of the claims.

This application is a continuation in part of my previous application filed on April 22, 1949, and bearing Serial No. 88,943, now U. S. Patent No. 2,712,777.

Having thus described the invention, I claim:

1. A method of making a seamless plastic folding container blank from an extruded plastic tube comprising flattening said tube to form folded side edges, cutting a blank from said flattened tube, inserting a flat rigid mandrel having scoring ridges mounted thereon between the walls of said blank, contacting cutting knives to each wall of said blank under sufficient pressure to cut completely through said walls along predetermined cutting lines, contacting resilient pads forcibly against said walls to press the walls against the scoring ridges of said mandrel sufficient to score said walls, and severing a portion of each folded side edge sufficient to form closing flaps at each end of the blank.

2. A method of making a seamless plastic folding container blank from an extruded plastic tube comprising flattening said tube to form folded side edges, cutting a blank from said flattened tube, inserting a flat rigid mandrel having scoring ridges mounted thereon between the walls of said blank, applying cutting knives forcibly to each wall of said blank sufficient to cut said walls along predetermined cutting lines while simultaneously applying resilient pads against each of said walls to press the walls against the scoring ridges of said mandrel under sufficient pressure to score said walls, and severing portions of each folded side edge sufficient to form closing flaps at each end of the blank.

3. The method of claim 2 wherein the cutting knives are driven entirely through the plastic walls of each blank and forcibly against the rigid flat surfaces of the mandrel.

4. The method of claim 2 wherein the plastic blank is cut and scored at each end thereof to form closing flaps.

5. The method of claim 2 wherein the scoring pads press each plastic wall against scoring ridges mounted longitudinally on the mandrel to score each of said walls along a line parallel to and intermediate of the folded side edges of the blank.

6. In apparatus for cutting and scoring a seamless plastic folding container blank, a flat rigid mandrel having scoring ridges mounted thereon and a pair of opposing cutting and scoring dies having cutting knives and scoring pads mounted thereon wherein the mandrel is mounted intermediate of the dies and where the scoring pads of the dies are adapted for reaction with the scoring ridges of the mandrel to score the plastic blank.

7. In apparatus for cutting and scoring a seamless plastic folding container blank, a flat rigid mandrel having scoring ridges mounted thereon and a pair of opposing cutting and scoring dies having cutting knives and scoring pads mounted thereon wherein the lower die is formed with brackets and studs for retaining the mandrel during the cutting and scoring operation.

8. A flat rigid mandrel for cutting and scoring a seamless plastic folding container blank comprising in combination a substantially rigid tongue element, a substantially rigid head element, raised scoring ridges secured to said elements and a pair of knife edges connecting the outer side edges of said tongue and head elements.

9. In apparatus for cutting and scoring a seamless plastic folding container blank having substantially flat, oppositely positioned plastic walls, a flat rigid mandrel inserted in said blank and cutting and scoring dies disposed adjacent each of said plastic walls, said mandrel and dies having cutting and scoring means disposed along predetermined lines, said mandrel and dies adapted to cooperate under pressure to cut and score foldable end closure elements in said blank along said predetermined lines.

10. The apparatus of claim 9 wherein the cutting and scoring dies have raised cutting knives and scoring pads disposed across the face thereof along the said predetermined lines and the mandrel has scoring ridges disposed across its face adapted to cooperate with said scoring pads.

References Cited in the file of this patent

UNITED STATES PATENTS

| | | |
|---|---|---|
| 996,785 | Motz | July 4, 1911 |
| 2,057,295 | Engel | Oct. 13, 1936 |
| 2,100,575 | Spanel | Nov. 30, 1937 |
| 2,100,576 | Spanel | Nov. 30, 1937 |
| 2,183,691 | Owens | Dec. 19, 1939 |
| 2,586,744 | Troth | Feb. 19, 1952 |
| 2,600,254 | Lysobey | June 10, 1952 |